United States Patent
Takahashi et al.

(10) Patent No.: US 6,344,880 B1
(45) Date of Patent: Feb. 5, 2002

(54) INFORMATION DISPLAY METHOD

(75) Inventors: Yasushi Takahashi, Chiba; Yoshihito Fujiwara; Kimiyoshi Yoshida, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/079,026

(22) Filed: May 14, 1998

(51) Int. Cl.$^7$ .............................. H04N 7/10; H04N 7/14
(52) U.S. Cl. ........................ 348/563; 348/906; 348/569; 725/56
(58) Field of Search ................................. 348/563, 906, 348/564, 569; 725/13, 56; H04N 7/10, 7/14

(56) References Cited

U.S. PATENT DOCUMENTS

| | | | | |
|---|---|---|---|---|
| 5,557,338 A | * | 9/1996 | Maze et al. .................. 348/565 |
| 5,592,551 A | * | 1/1997 | Lett et al. .................... 348/906 |
| 5,623,613 A | * | 4/1997 | Rowe et al. ................. 395/353 |
| 5,630,119 A | * | 5/1997 | Aristides et al. ............. 348/906 |
| 5,686,954 A | * | 11/1997 | Yoshinobu et al. .......... 348/460 |
| 5,694,176 A | * | 12/1997 | Bruette et al. ............... 348/563 |
| 5,699,107 A | * | 12/1997 | Lawler ......................... 348/906 |
| 5,758,259 A | * | 5/1998 | Lawler ......................... 348/563 |
| 5,793,438 A | * | 8/1998 | Bedard ......................... 348/569 |
| 5,801,747 A | * | 9/1998 | Bedard ......................... 725/13 |
| 5,805,235 A | * | 9/1998 | Bedard ......................... 348/569 |
| 5,926,207 A | * | 7/1999 | Vaughan et al. ............. 348/906 |
| 5,940,073 A | * | 8/1999 | Klosterman et al. ......... 348/906 |
| 5,978,043 A | * | 11/1999 | Blonstein et al. ............ 348/569 |
| 6,008,803 A | * | 12/1999 | Rowe et al. ................. 345/327 |
| 6,025,837 A | * | 2/2000 | Matthews, III et al. ...... 345/327 |

* cited by examiner

Primary Examiner—Michael Lee
Assistant Examiner—Linus H. Lo
(74) Attorney, Agent, or Firm—Frommer Lawrence & Haug LLP; William S. Frommer; Darren M. Simon

(57) ABSTRACT

An information display method comprises a first display step of displaying information icons EY for guiding respective information on a part of a display screen as the base units of an information guide; a second display step of displaying the summaries of information corresponding to the information icons EY in the forms of titles TY at display positions corresponding to the information icons EY; and a third display step of displaying the explanation of the contents of the information which corresponds to the information icons EY at positions respectively corresponding to the information icons EY and the displays of the titles TY. The respective display steps can be switched or changed by a viewer or a user, so that desired information can be more readily and understandably retrieved.

18 Claims, 15 Drawing Sheets

INFORMATION DISPLAY METHOD

BACKGROUND OF THE INVENTION

1. Field of the Invention

The present invention relates to an information display method, and more particularly, is suitably applied to an information display method for guiding and displaying various kinds of programs when a viewer selects a desired program among many television programs which are transmitted, for instance, through a broadcasting satellite.

2. Description of the Related Art

Conventionally, in a satellite broadcasting system in which television programs are transmitted to viewers through a broadcasting satellite, television signals have been digitized and an enormous number of programs have been simultaneously transmitted. In such a system, the number of programs which are selected by the viewers has been extremely increased.

Further, in a system for providing a great variety of information such as programs, movies, music, articles of magazines, commercial information, and so on to the terminal of a computer from a host side through a telephone line or a private line, a user on the terminal side has needed to select necessary information among a huge number of information, and therefore, he has needed to request the host side to supply the information.

When the viewer or the user tries to select a desired television program or information or the like by using a computer, he must retrieve or search for the desired program or the information among an extremely large number of programs or information. In this case, the user needs to do an operation that he searches for or retrieves the desired information while information units which are classified hierarchically based on a certain concept are displayed on the screen of a monitor. Thus, there have been encountered troublesome problems that the user or viewer is brought into a state in which he cannot recognize the hierarchical layer of information for which he is searching at present, and the user misunderstands the concept for classification, hence, he hardly retrieves or searches for the desired information with easiness.

SUMMARY OF THE INVENTION

In view of the foregoing, an object of the present invention is to provide an information display method by which a viewer or a user can readily retrieve or search for desired information.

In order to achieve the above described object, an information display method according to the present invention comprises a first display step of displaying information icons for guiding respective information on a part of a display screen as the base units of an information guide; a second display step of displaying the summaries of information corresponding to the information icons in the forms of titles at display positions corresponding to the information icons; and a third display step of displaying the explanation of the contents of the information which corresponds to the information icons at positions respectively corresponding to the information icons and the displays of the titles.

As described, according to the present invention, the screen on which a plurality of information icons are displayed, the screen on which the summary of information corresponding to a specific information icon is displayed in the forms of title and the screen on which the explanation of contents of the information corresponding to the specific information icon is displayed can be respectively switched under the operation of the user. Therefore, a manageability for the user can be desirably improved by switching continuous and integrated display forms.

The nature, principle and utility of the invention will become more apparent from the following detailed description when read in conjunction with the accompanying drawings in which like parts are designated by like reference numerals or characters.

Figure 10:
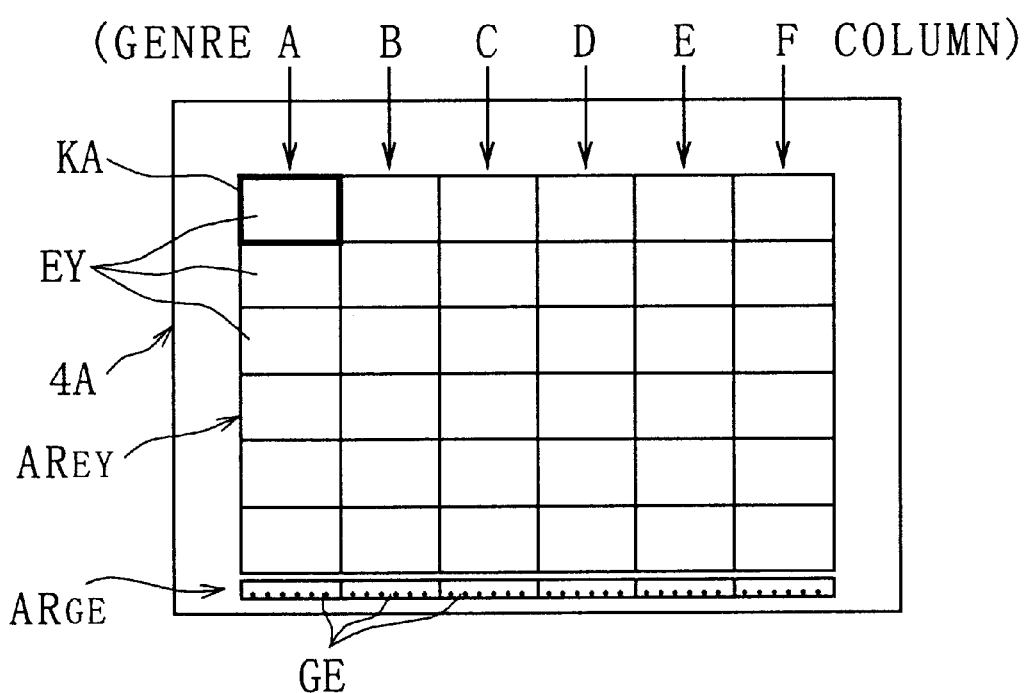
Figure 9:
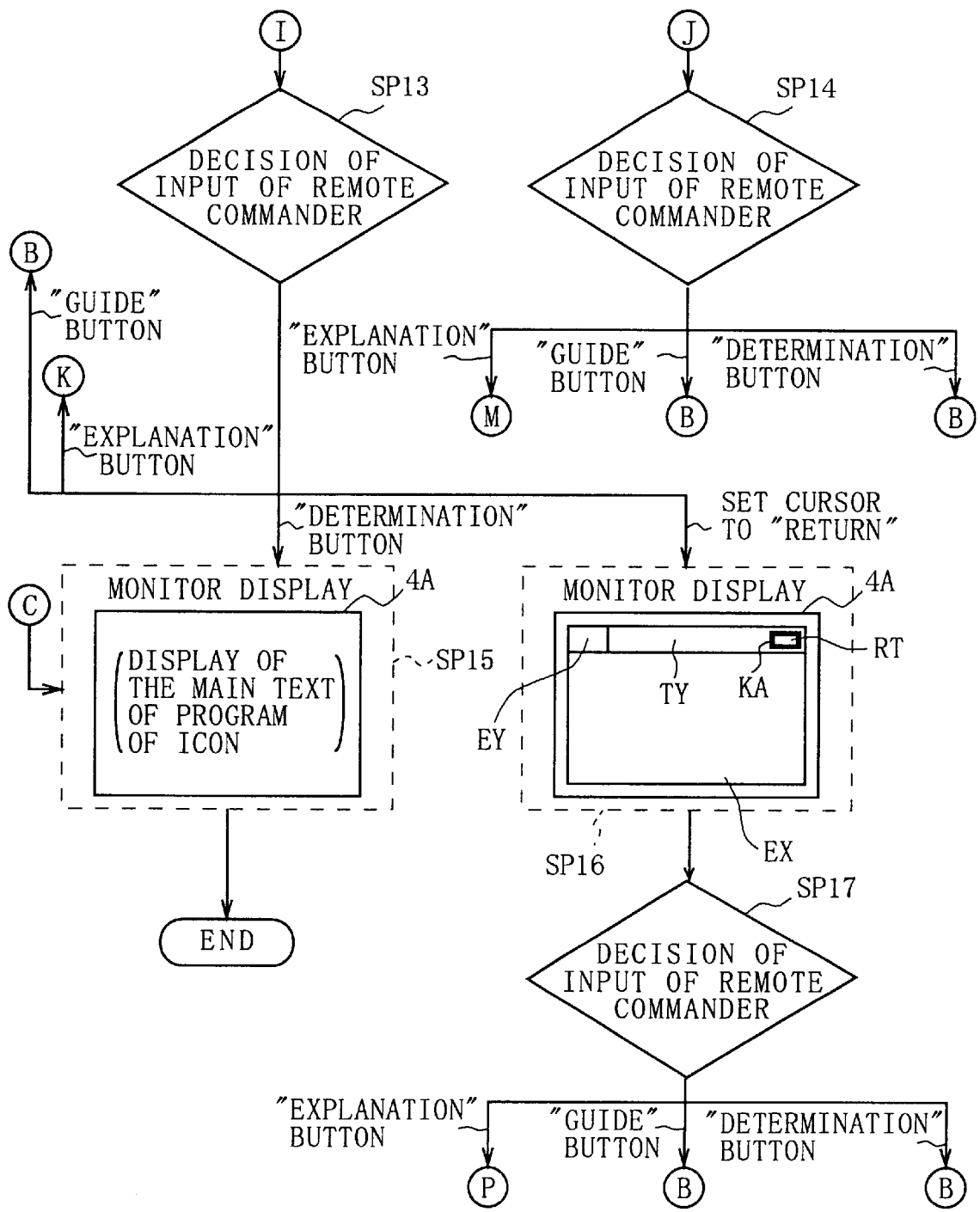
Figure 11A:
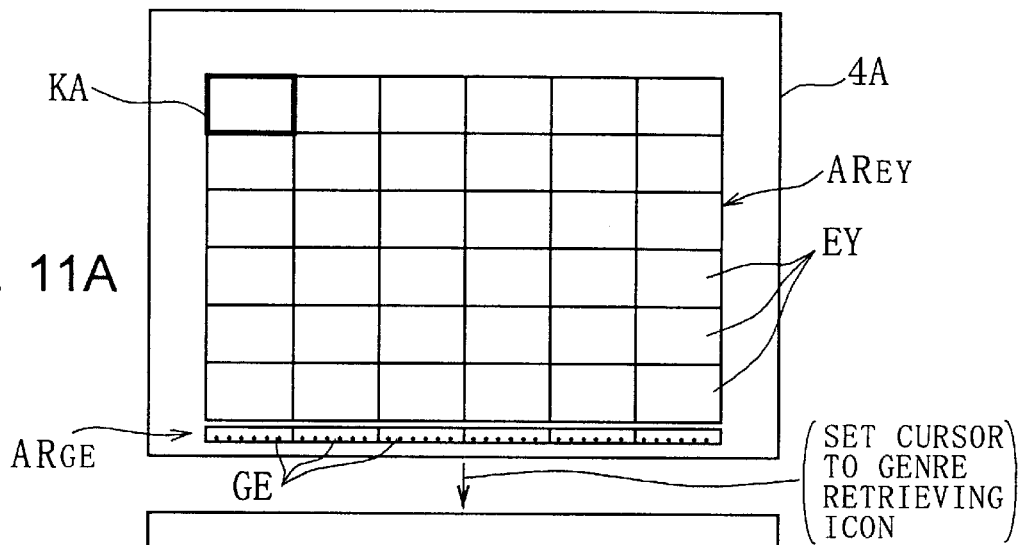
Figure 11B:
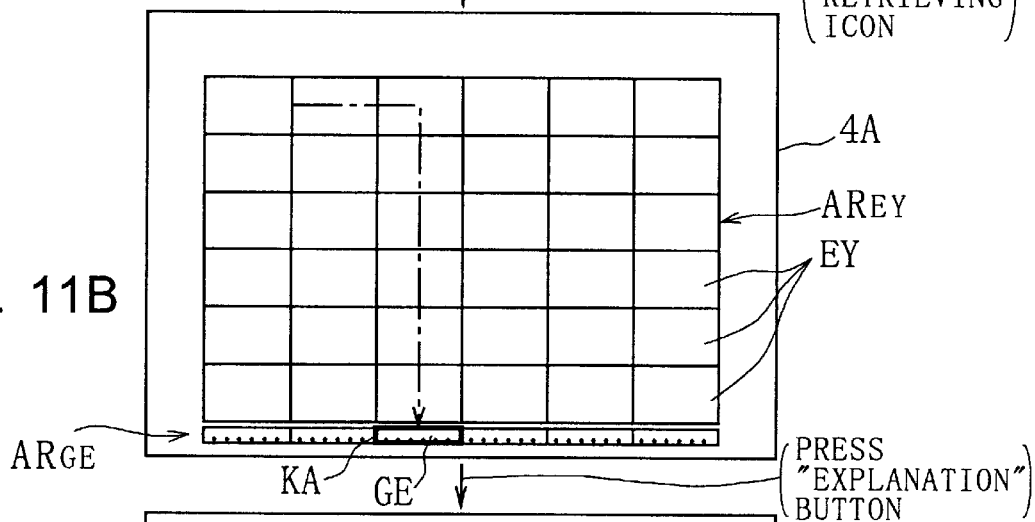
Figure 11C:
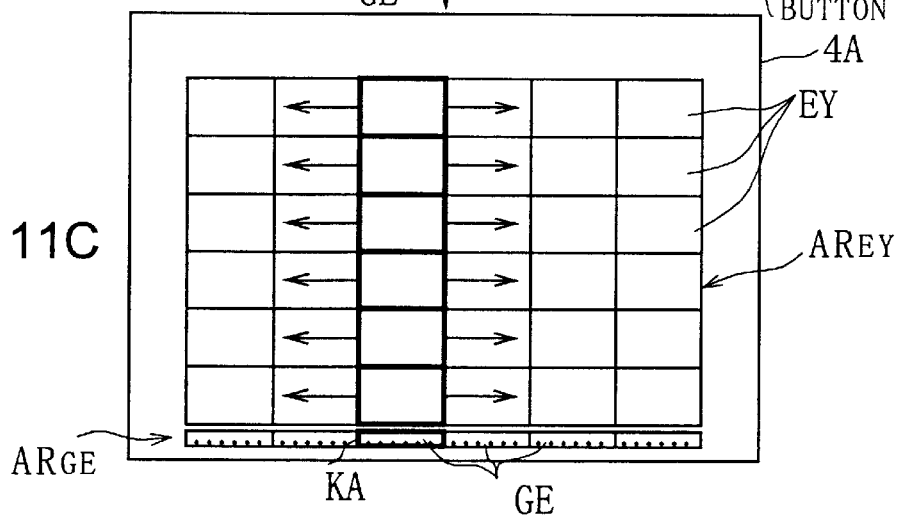
Figure 12A:
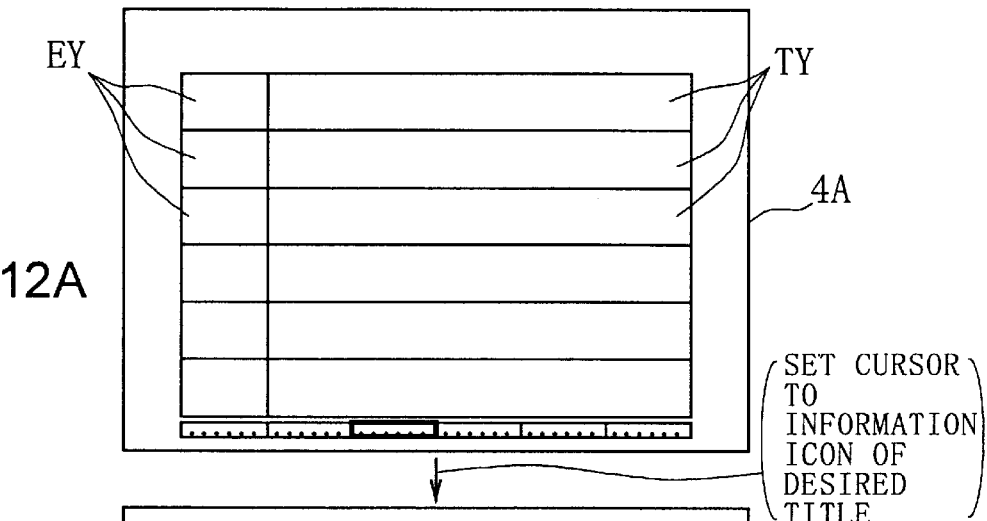
Figure 12B:
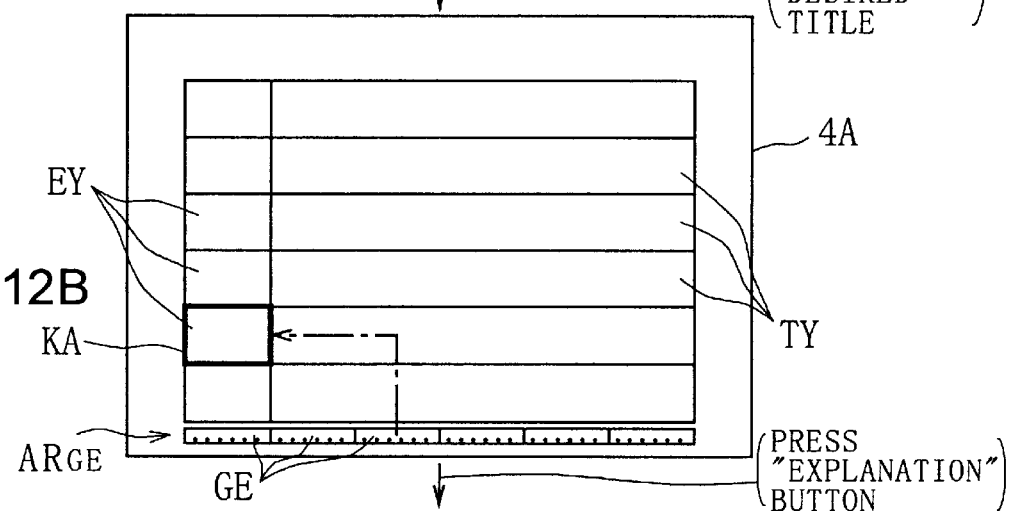
Figure 12C:
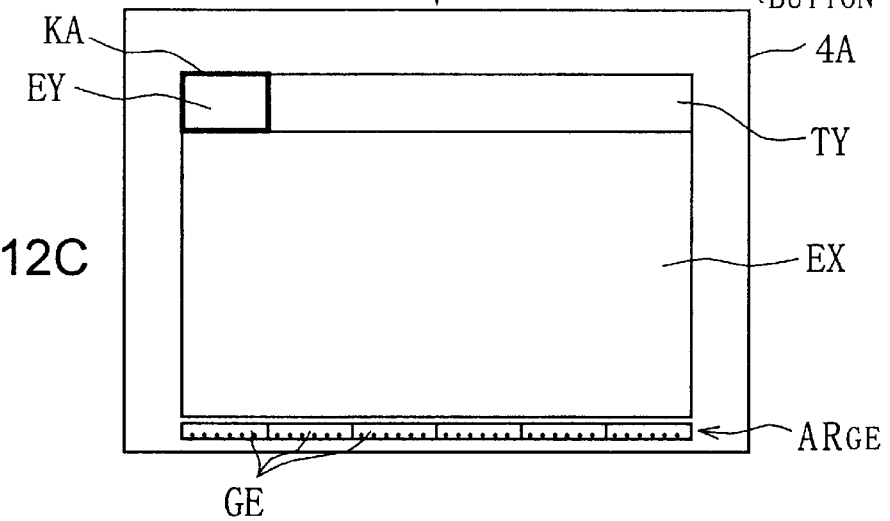
Figure 13A:
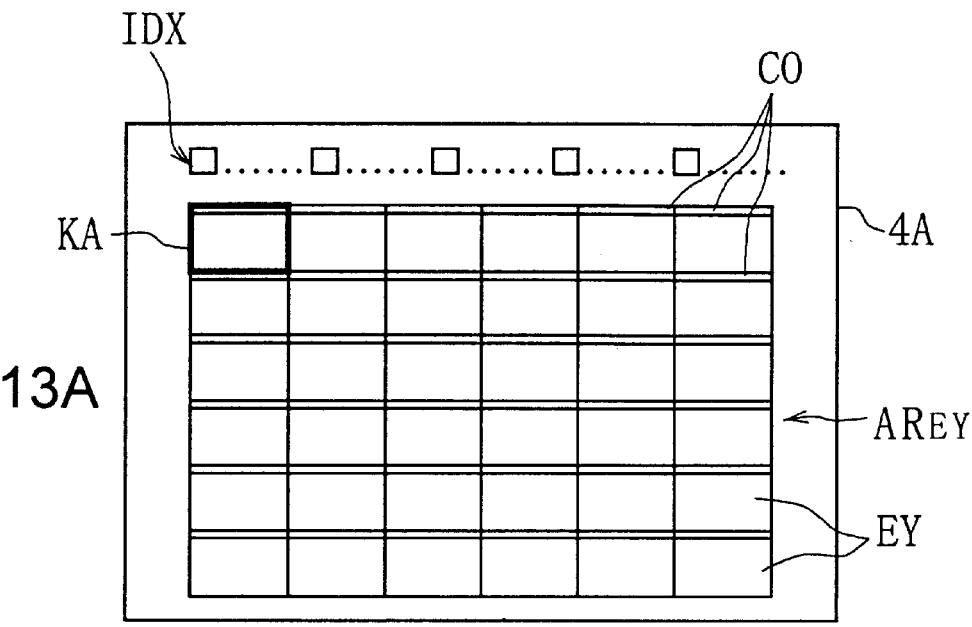
Figure 13B:
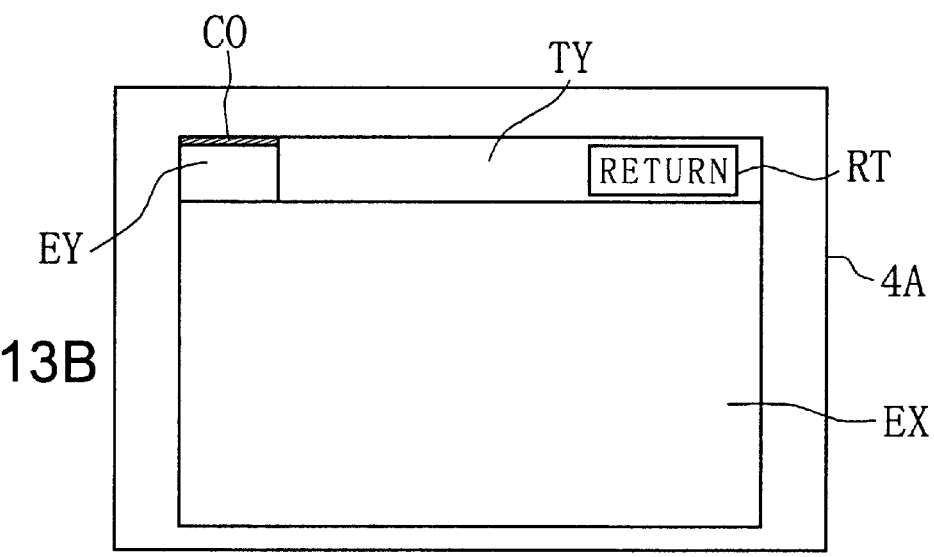
Figure 15A:
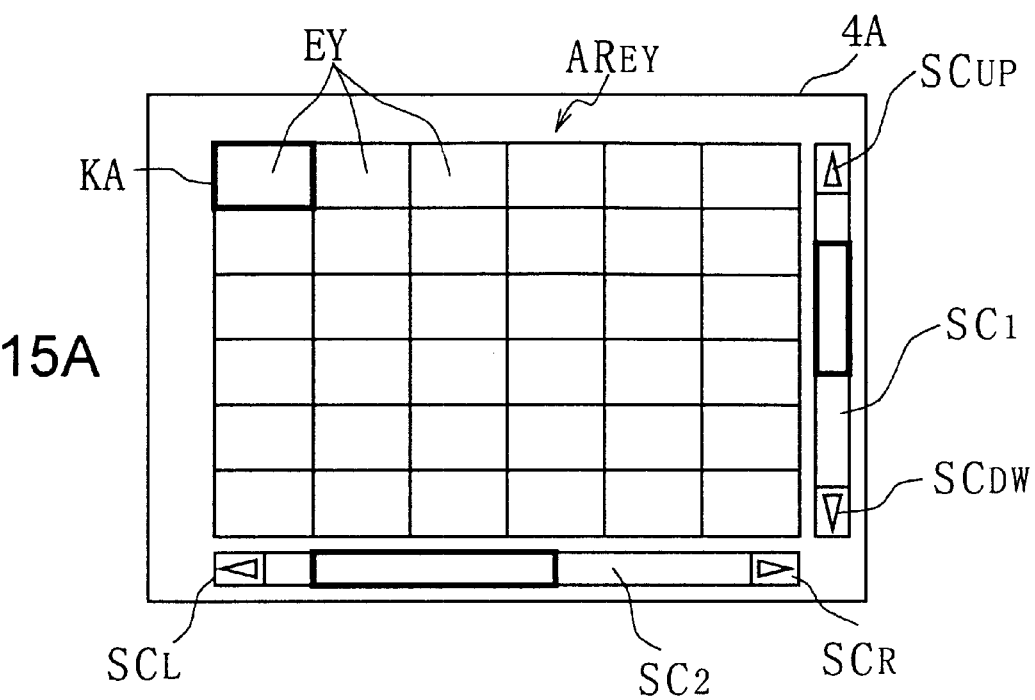
Figure 15B:
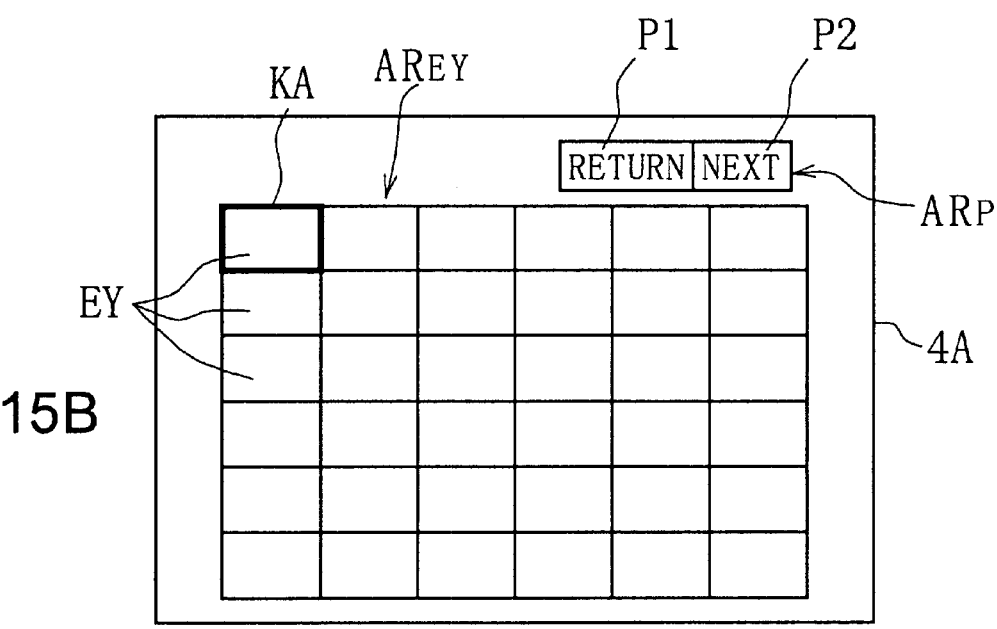
Figure 16A:
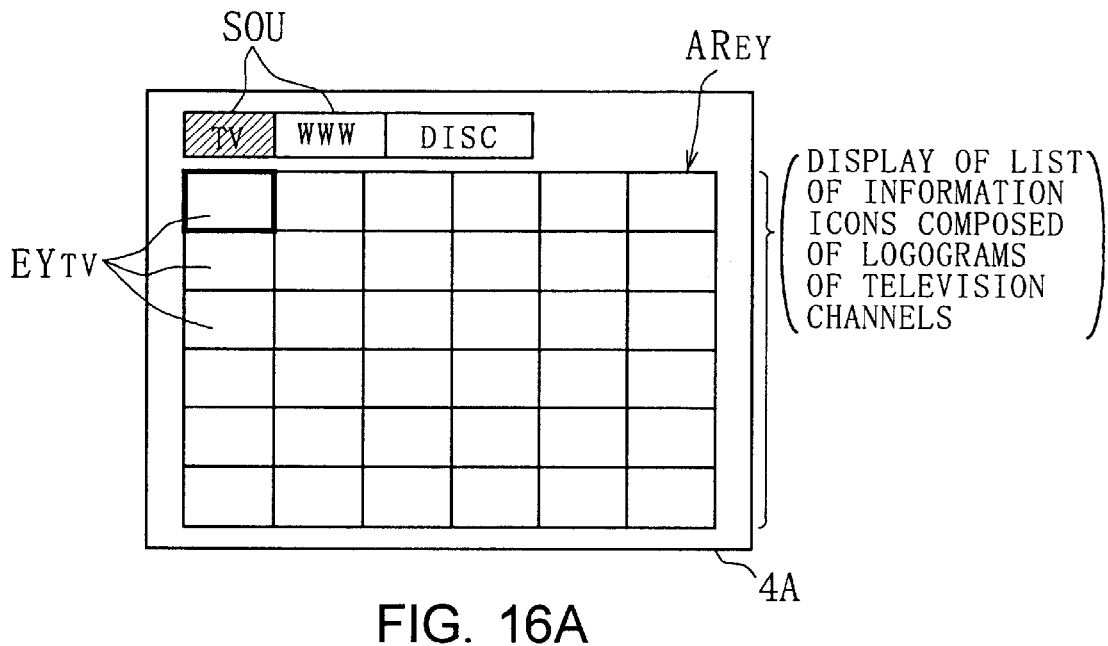
Figure 16B:
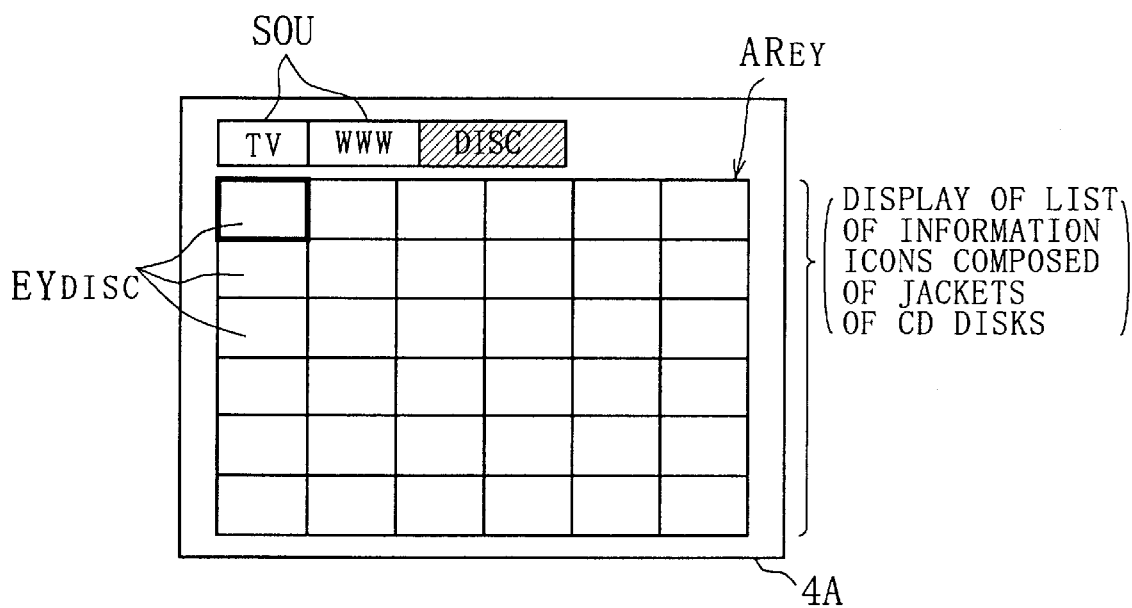

FIG. B is a flowchart showing an information display procedure;

FIG. 9 is a flowchart showing an information display procedure;

FIG. 10 is a diagrammatic view showing the arrangements of information icons for respective genre;

FIGS. 11A, 11B and 11C show diagrammatic views used for explaining a retrieving and displaying procedure by employing genre retrieving icons;

FIGS. 12A, 12B and 12C show diagrammatic views used for explanation of a retrieving and displaying procedure by employing genre retrieving icons;

FIGS. 13A and 13B show diagrammatic views respectively illustrating display example with genre identification codes;

FIGS. 14A, 14B, 14C and 14D show diagrammatic views respectively illustrating an alternative example of a genre identification code part;

FIGS. 15A and 15B show diagrammatic views respectively illustrating display examples by switching many icons; and FIGS. 16A and 16B show diagrammatic views respectively illustrating display examples by switching source icons.

DETAILED DESCRIPTION OF THE EMBODIMENT

Preferred embodiment of the present invention will be described with reference to the accompanying drawings:

(1) Entire Configuration of Satellite Broadcast Receiving System

Figure 1:
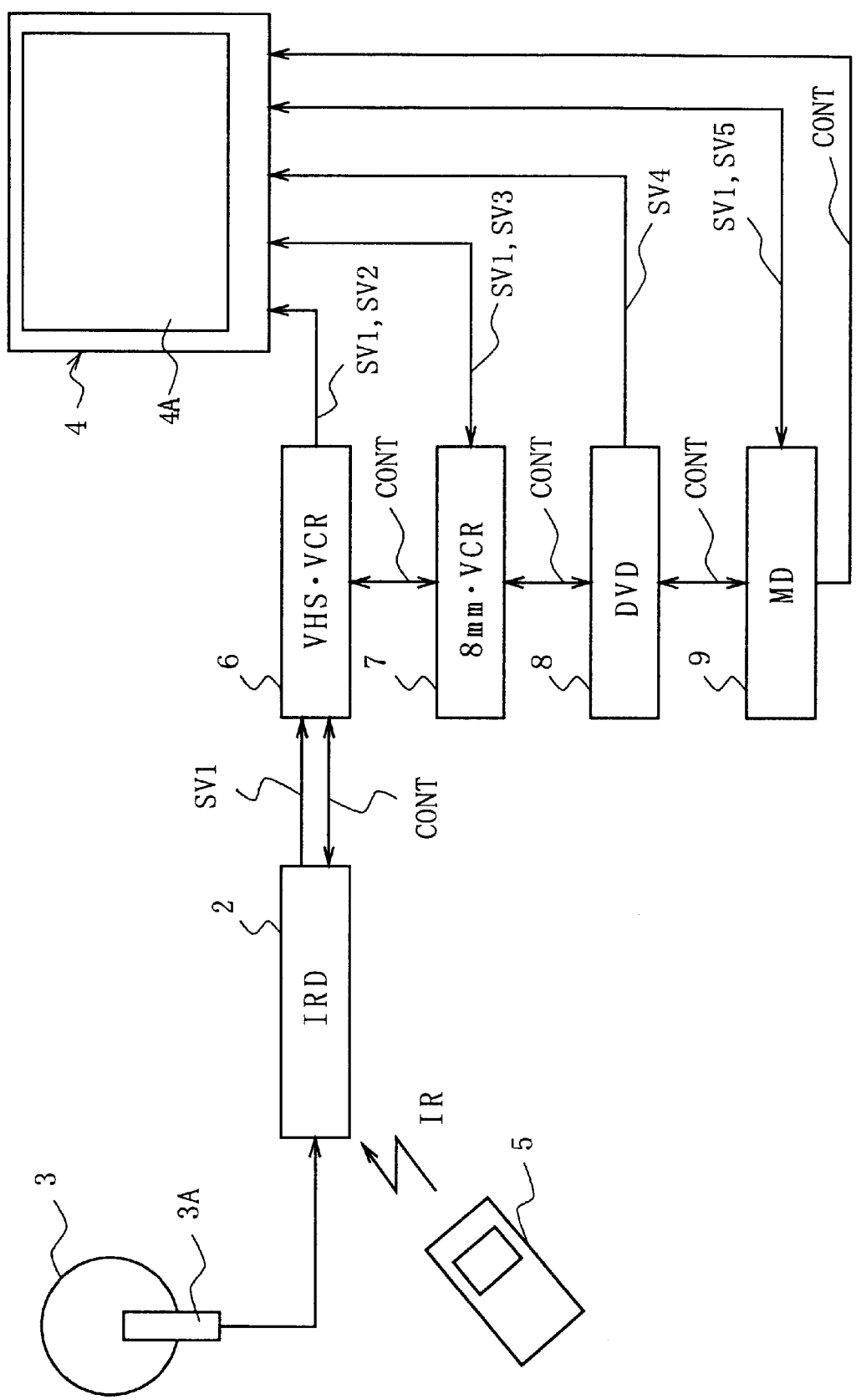
FIG. 1 is a block diagram showing a satellite broadcast receiving system to which an information display method according to the present invention is applied.

With reference to FIG. 1, reference numeral 1 generally designates a satellite broadcast receiving system. A broadcasting signal received by a parabola antenna 3 is demodulated, compressed and decoded by a receiver/decoder (Integrated Receiver/Decoder: IRD) 2. A video/audio signal SV1 obtained as a result of these procedures by the receiver/decoder 2 is sent to a Video Cassette Recorder (VCR) 6 of a VHS type.

The VCR 6 serves to record the video/audio signal SV1 on a video tape with which the VCR 6 is loaded, or directly transmit the video/audio signal SV1 to a monitor device 4 from an output line and display it on a monitor.

Further when a viewer operates a remote commander 5, a command equivalent to this operation is converted into an infrared signal IR and the infrared signal IR is transmitted to the receiver/decoder 2. The receiver/decoder 2 executes various kinds of procedures such as switching of channels, registering/reading out user data, transmitting a control signal CONT to respective devices VCR 6, VCR 7, DVD 8 and MD 9 which are connected to the receiver/decoder 2, etc., based on the command. The control signal CONT is sent to the VCR 6 through a control line. When the VCR is designated as an object to be controlled by the control signal CONT, the VCR 6 is controlled by the control signal CONT. On the other hand, when any one of the devices such as the VCR 7 of 8 mm type, the digital video disk (DVD) player 8, the mini disk (MD) player 9 and the monitor device 4 which are sequentially connected through the control line to the VCR 6 is designated as an object to be controlled by the control signal CONT, the VCR 6 sends the control signal CONT to the next VCR 7 of the 8 mm type just as it is.

When the control signal CONT is inputted to the VCR 7, the VCR 7 discriminates the device designated by the control signal CONT from other devices. When the discriminated result indicates the VCR 7, the VCR 7 performs an operation designated by the control signal CONT. When this instruction is, for instance, an instruction for reproducing an 8 mm video tape with which the VCR 7 is loaded, the VCR 7 reproduces the video tape, so that a reproduced video signal SV3 is transmitted to the monitor device 4 and displayed thereon. Further, when the instruction designated by the control signal CONT is an instruction for recording the broadcasting signal (video/audio signal SV1) which is received and decoded by the receiver/decoder 2 in the VCR 7, the VCR 7 records the video/audio signal SV1 inputted through the VCR 6 of the VHS type and the monitor device 4 from the receiver/decoder 2. On the contrary, when an object to be controlled by the control signal CONT is not the VCR 7, the VCR 7 continuously transmits the control signal CONT to the next DVD 8.

When the control signal CONT is inputted to the DVD 8, the DVD 8 discriminates the device designated by the control signal CONT from other devices. When the discriminated result indicates the DVD 8, the DVD 8 carries out an operation designated by the control signal CONT. In case this instruction is, for example, an instruction for reproducing video and/or audio data from a disk with which the DVD 8 is loaded, the DVD 8 reproduces the video and/or audio data from the disk. Thus, a video/audio signal SV4 is transmitted to the monitor device 4 and displayed thereon. On the contrary, in case the DVD 8 is not an object to be controlled by the control signal CONT, the DVD 8 sends the control signal CONT to the next MD 9 just as it is.

When the control signal CONT is inputted to the MD 9, the MD 9 discriminates the device designated by the control signal CONT from other devices. When the discriminated result indicates the MD 9, the MD 9 executes an operation designated by the control signal CONT. When this instruction is, for example, an instruction for reproducing the data of the disk mounted on the MD 9, the MD 9 reproduces the data of the disk. Accordingly, an audio signal SV5 is transmitted to the monitor device 4 and audibly displayed thereon. Further, in case the instruction designated by the control signal CONT is an instruction for recording the broadcasting signal (video/audio signal SV1) which is received and decoded by the receiver/decoder 2 in the MD 9, the MD 9 records the audio signal of the video/audio signal SV1 inputted through the VCR 6 of the VHS type and the monitor device 4 from the receiver/decoder 2. Conversely, when the object to be controlled by the control signal CONT is not the MD 9, the MD 9 continuously sends the control signal CONT to the monitor device 4 as it is. At this time, the monitor device 4 carries out an operation instructed by the control signal CONT.

(2) Configuration of Receiver/Decoder

Figure 2:
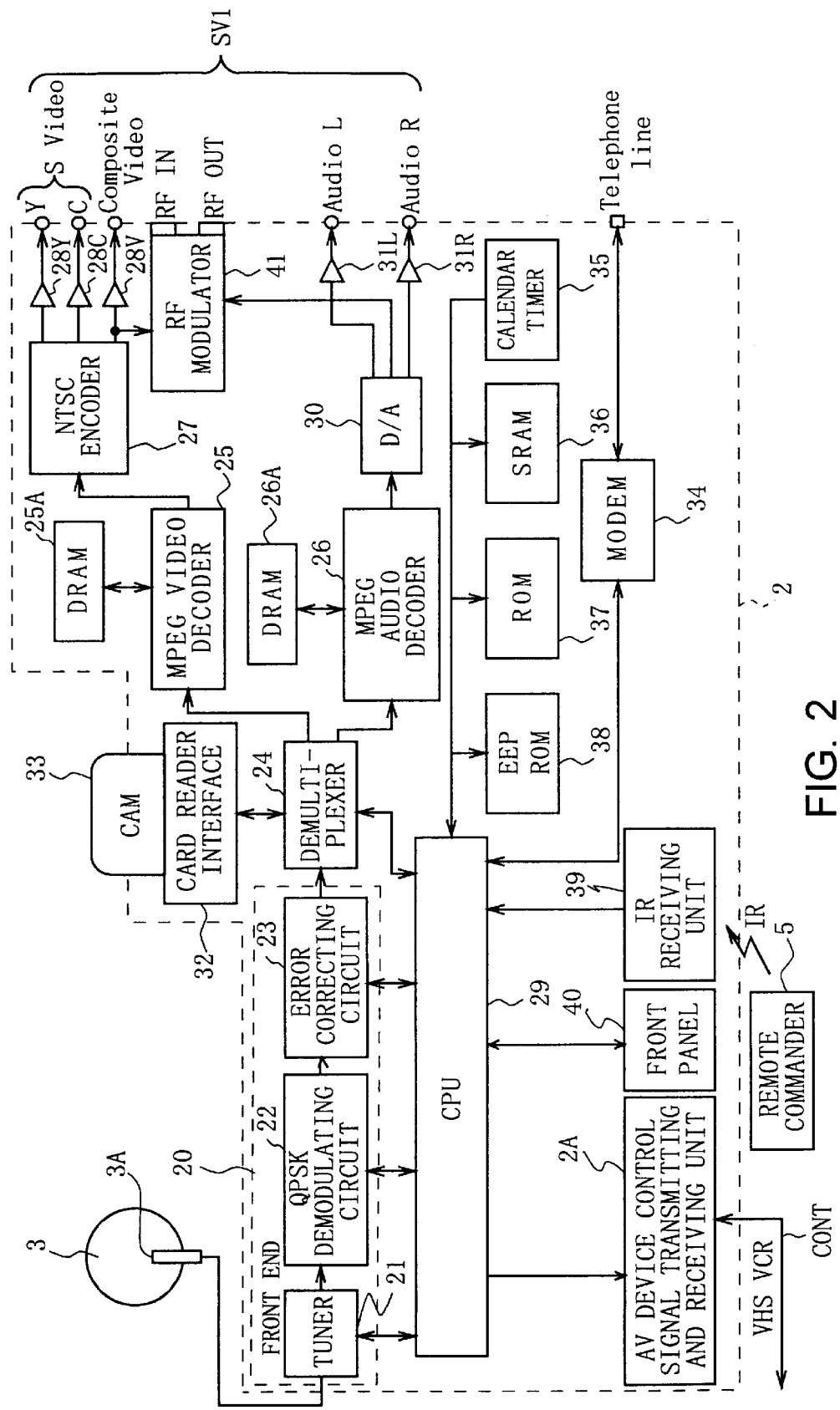
FIG. 2 is a block diagram showing the configuration of a receiver/decoder.

Referring to FIG. 2, an RF signal outputted by the low noise block down converter (referred to as an LNB, hereinafter) 3A of the parabola antenna 3 of the receiver/decoder 2 is supplied to the tuner 21 of a front end 20 and demodulated by the receiver/decoder 2. The output of the tuner 21 is supplied to a QPSK demodulating circuit 22 and undergoes a QPSK demodulating processing. The output of the QPSK demodulating circuit 22 is supplied to an error correcting circuit 23 so that an error is detected and corrected and compensated as necessary.

In a conditional access module (referred to as a CAM, hereinafter) 33 composed of an IC card comprising a CPU, a ROM and a RAM, a key required for decoding a cipher code is stored together with a decoding program. Since a signal transmitted through a broadcasting satellite is encoded, the key and a decoding processing are required in order to decode this cipher code. Thus, the key is read out from the CAM 33 through a card reader interface 32 and supplied to a demultiplexer 24. Then, the demultiplexer 24 decodes the encoded signal by using the key.

The demultiplexer 24 receives a signal outputted from the error correcting circuit 23 of the front end 20, supplies a decoded video signal to an MPEG video decoder 25 and supplies a decoded audio signal to an MPEG audio decoder 26.

The MPEG video decoder 25 stores an inputted digital video signal in a DRAM 25A and executes a decoding processing to the video signal which is compressed in accordance with an MPEG mode. The decoded video signal is supplied to an NTSC encoder 27 and the decoded video signal is converted into a luminance signal (Y), a chroma signal (C) and a composite signal (V) of an NTSC mode. The luminance signal and the chroma signal are respectively outputted as S video signals through buffer amplifiers 28Y and 28C. Further, the composite signal is outputted through a buffer amplifier 28V.

The MPEG audio decoder 26 stores a digital audio signal supplied from the demultiplexer 24 in DRAM 26A and performs a decoding processing to the audio signal which is compressed in accordance with the MPEG mode. The decoded audio signal undergoes a digital/analog conversion in a D/A converter 30, the audio signal of a left channel is outputted through a buffer amplifier 31L and the audio signal of a right channel is outputted through a buffer amplifier 31R.

An RF modulator 41 converts the composite signal outputted by the NTSC encoder 27 and the audio signal outputted from the D/A converter 30 into the RF signals and outputs the RF signals. Further, the RF modulator 41 passes the RF signals of the NTSC mode which are inputted from other devices and outputs them to other devices just as they are.

In the case of the present embodiment, these video signals and audio signals are supplied to the VCR 6 through an AV line.

A CPU 29 performs a variety of procedures in accordance with a program stored in a ROM 37. The CPU 29 also controls an AV device control signal receiving/transmitting part 2A so as to output the control signals to other devices through the control line, or receive the control signals from other devices.

A prescribed command can be directly inputted to the CPU 29 by operating the operating button switch of a front panel 40. In addition, when the operating key of a remote commander 5 is operated, an infrared signal is outputted by the IR transmitting part of the remote commander 5, the infrared signal is received by an IR receiving unit 39 and the infrared ray receiving result is supplied to the CPU 29. Therefore, a prescribed command can be also inputted to the CPU 29 by operating the remote commander 5.

Further, the CPU 29 fetches or takes, for instance, electronic program guide (called an EPG, hereinafter) information except the video signals and the audio signals which are outputted from the demultiplexer 24, creates EPG data therefrom, supplies the EPG data to a static random access memory (simply called a SRAM, hereinafter) 36 and stores it therein. The EPG information includes information (for example, the channels of programs, broadcasting time, the tiles of the programs, the genres of the programs and the explanation of programs etc.) which relates to the programs of respective broadcasting channels to be broadcasted from the present time to the time after several ten hours therefrom. Since this EPG information is frequently transmitted, the latest EPG information is always held in the SRAM 36.

In an electrically erasable programmable read only memory (simply called an EEPROM, hereinafter) 38, data which is desirably stored even after a power is turned off or reloadable data such as the receiving history of the tuner 21 for four weeks in the past or the like is stored. Further, the CPU 29 compares time information outputted by a calendar timer 35 with a time stamp separated and outputted from a receiving signal by the demultiplexer 24, and controls the MPEG video decoder 25 or the MPEG audio decoder 26 so as to perform a decoding processing at an appropriate timing to meet the compared result.

Further, when the CPU 29 has a desire to generate prescribed on-screen display (referred to as an OSD, hereinafter) data, the CPU 29 controls the MPEG video decoder 25. The MPEG video decoder 25 generates the prescribed OSD data so as to meet this control, writes the OSD data in the DRAM 25A, further reads out and outputs it. Accordingly, prescribed characters, graphic forms, etc. can be outputted to and displayed on the monitor device 4.

When the operating key of the program guide is selected in the remote commander 5 or the front panel 40, the CPU 29 controls the MPG video decoder 25 to display a broadcasting program selecting screen on the monitor device 4. Then, a user can move a cursor to the position of a desired program on this screen and click the remote commander 5, so that he can select and designate the desired program.

(3) Display of Information by Information Guide System

The CPU 29 of the receiver/decoder 2 shown in FIG. 2 displays the EPG information which is fetched to or taken in the SRAM 36 in accordance with the information guide program of the ROM 37 on the display screen 4A of the monitor device 4 under the control of the remote commander 5 of the user.

Figure 3:
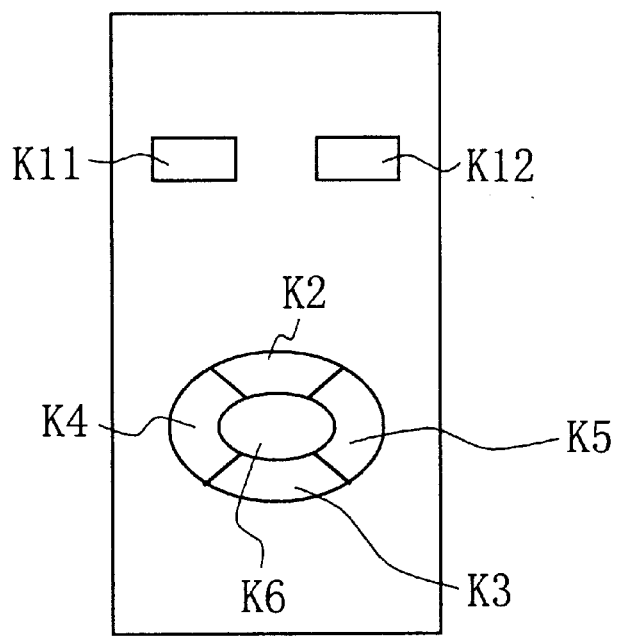
FIG. 3 is a plan view showing an example of the arrangement of various kinds of operating buttons of a remote commander.

As illustrated in FIG. 3, the remote commander 5 is provided with cursor moving buttons K2, K3, K4 and K5 for moving the cursor displayed on the display screen 4A rightward and leftward and upward and downward and a determination button K6 for determining an item or a program which is indicated by the cursor. Additionally, on the remote commander 5, there are provided a guide button K11 for setting an information guide or program guide mode and an explanation button K12 for switching the display modes of information displayed on the display screen 4A. The CPU 29 shown in FIG. 2 displays the EPG information respectively corresponding to the operations of these buttons on the display screen 4A.

Figure 4A:
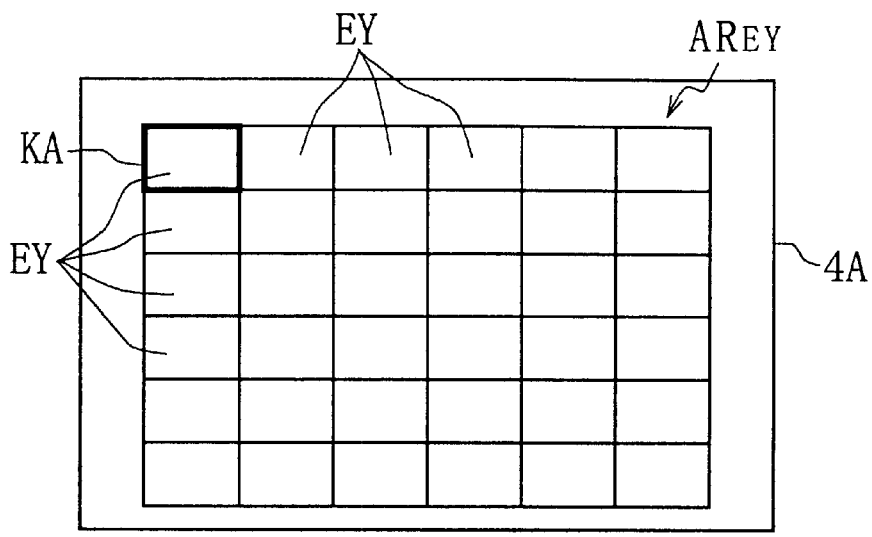
FIGS. 4A, 4B and 4C show diagrammatic views illustrating the change of program guide screens of an information card type.

Specifically stated, when the information guide mode is set under the operation of the guide button K11 of the remote commander 5, a plurality of information icon parts EY are displayed on an information icon chart display part $AR_{EY}$ as can be seen in FIG. 4A. The respective information icons EY are provided respectively so as to correspond to the broadcasting channels. Graphic characters such as the graphic pictures of image, logogrammatic marks or languages, etc. in which broadcasting stations that provide the programs of the channels are represented by graphic forms or characters are displayed and any one of the information icons parts EY is designated by a cursor KA. This cursor KA can be moved upward and downward and rightward and leftward by the cursor moving buttons K2 to K5 of the remote commander 5. When the explanation button K12 of the remote commander 5 is operated under a condition in which the cursor designates any one of the information icon parts EY, a screen of an information card type as shown in FIG. 4B is displayed on the display screen 4A.

This screen includes in the horizontal direction of the information icon part EY which is designated by the cursor KA under the state shown in FIG. 4A a title part TY comprising the title of the program to be broadcasted in the channel designated by the information icon part EY in question and its summary described in a simple sentence. A return icon part RT is displayed at the corner part of the title part TY. The return icon part RT is designated by the cursor, so that the screen shown in FIG. 4B can be returned to the screen shown in FIG. 4A. Parenthetically, in FIG. 4B, an area composed of the information icon part EY designated by the cursor KA, the title part TY and the return icon part RT is called a title bar.

Figure 4B:
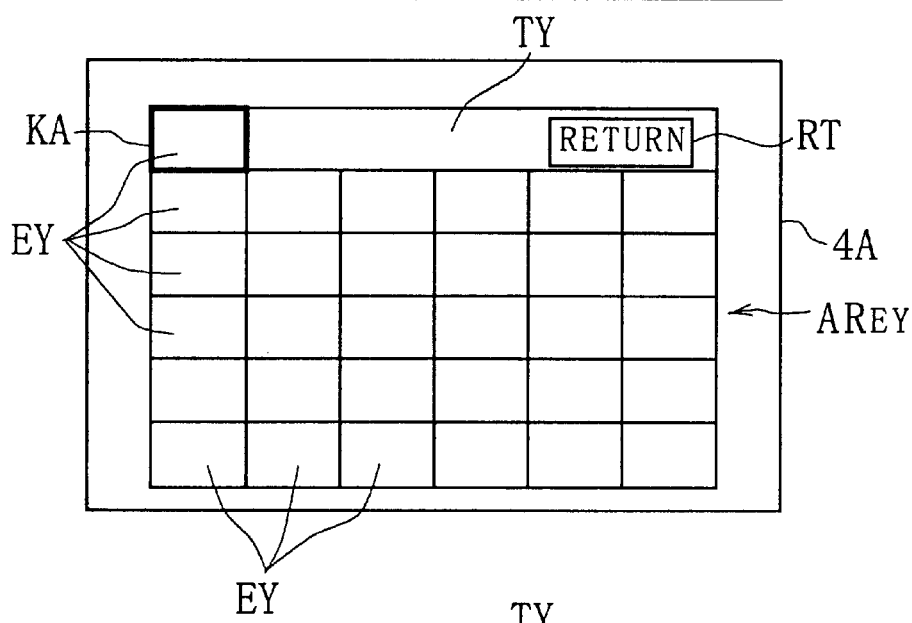
Figure 4C:
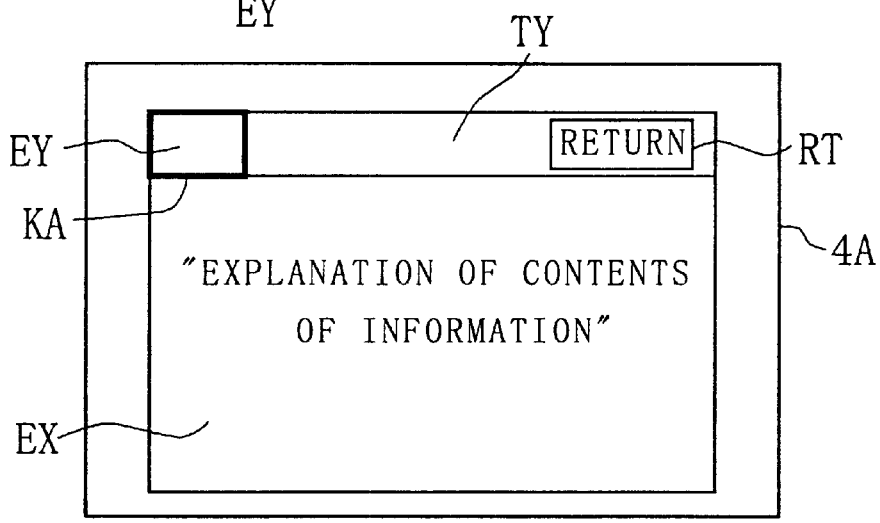

Further, when the explanation button K12 of the remote commander 5 is operated under a state shown in FIG. 4B, the screen of FIG. 4B is switched or changed to a screen having an information content explaining part EX below the title part TY, as illustrated in FIG. 4C. In the information content explaining part EX, the information of detailed contents of a program which is designated by the information icon EY at this time is expressed by sentences. The return icon part RT is designated by the cursor on the screen of FIG. 4C so that the screen shown in FIG. 4C can be returned to the screen shown in FIG. 4B.

Figure 5A:
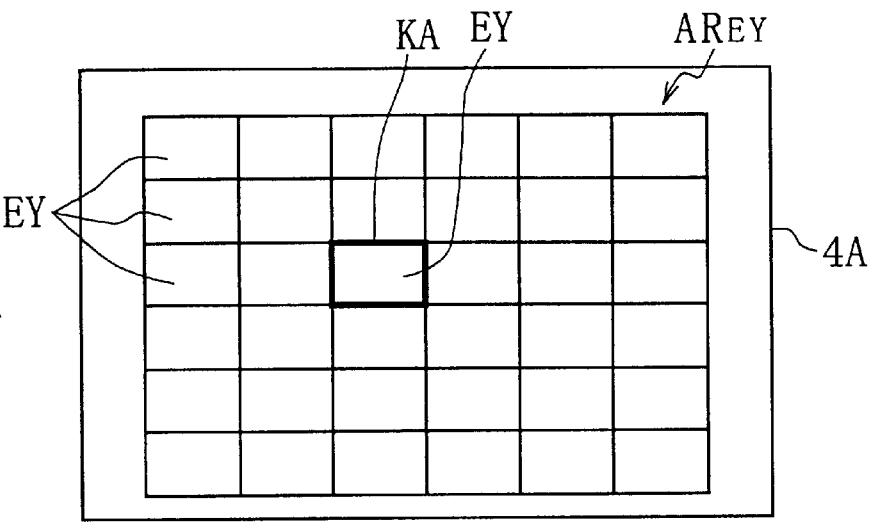
FIGS. 5A, 5B and 5C show diagrammatic views illustrating the change of program guide screens of an information card type.
Figure 5B:
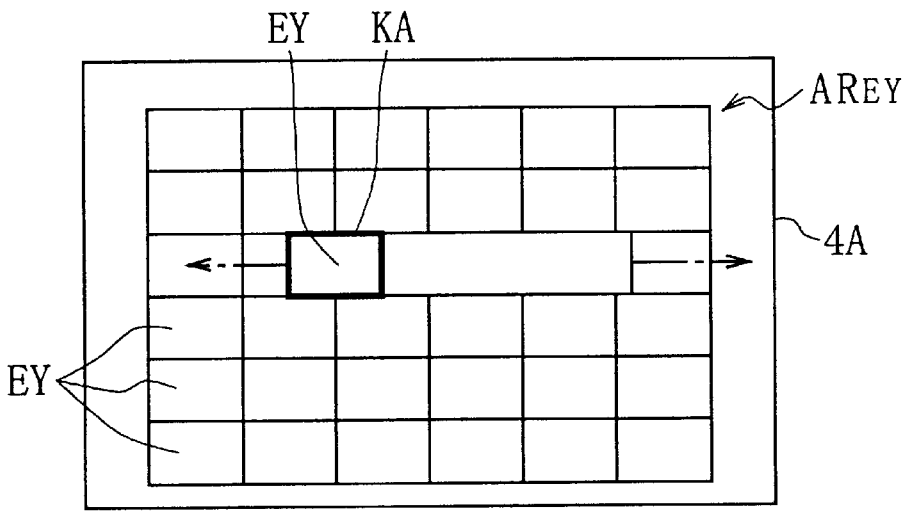
Figure 5C:
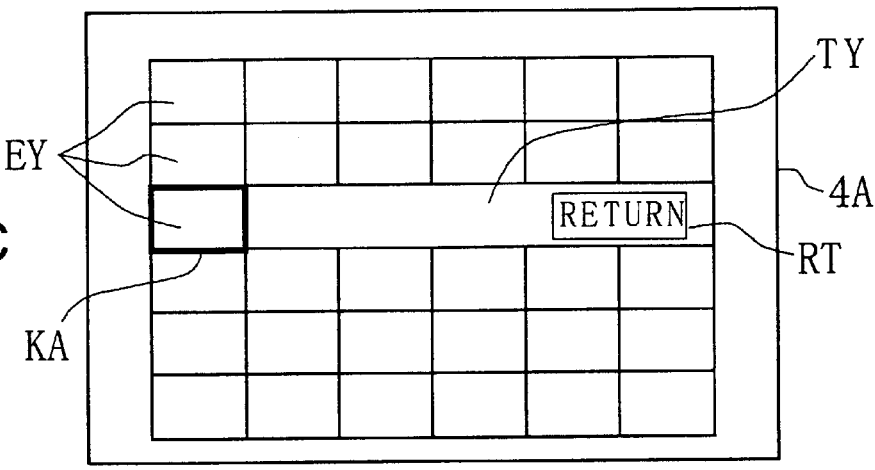

In this connection, in FIGS. 4A, 4B and 4C, the information icon part EY located at the upper and left corner part is designated by the cursor among a plurality of information icon parts displayed on the information icon chart display part $AR_{EY}$ so that the title part TY is displayed in the side part of the information icon part EY in question. However, as shown in FIG. 5A, when an information icon part EY located at an arbitrary position is designated by the cursor, the information icon part EY designated by the cursor is moved, for instance, leftward, as illustrated in FIG. 5B, and a title part TY and a return icon part RT are displayed in the right side of that information icon part EY as illustrated in FIG. 5C.

When the explanation button K12 of the remote commander 5 is pressed under this state, the information icon part EY and the title part TY are moved to their uppermost stage, so that an information content explaining part EX as described above with reference to FIG. 4C is displayed below the title part TY.

Now, an explanation will be given to FIGS. 6 to 9 in which a series of information display procedures are illustrated. In step SP1 of FIG. 6, the main text of a program designated by a channel at this time is displayed on the display screen 4A of the monitor device 4. Under this state, the CPU 29 of the receiver/decoder 2 waits for the input operation of the remote commander 5 by the user. In this case, when the user presses any one of the operating buttons of the remote commander 5, the CPU. 29 advances to step SP2 to decide the contents of the input by the remote commander 5.

In this instance, in case the determination button K6 of the remote commander 5 is being operated, the CPU 29 returns to the above described step SP1 so that it continues to display the main text of the program. On the other hand, in case it is decided that the explanation button K12 of the remote commander 5 is being operated, the CPU 29 advances to step SP4 so that it displays on the display screen 4A an information icon chart display part $AR_{EY}$ in which the information icon part EY corresponding to the program displayed on the display screen 4A in the above mentioned step SP1 is indicated by the cursor KA.

Further, in the step SP2, when it is discriminated the guide button K11 of the remote commander 5 is being operated, the CPU 29 moves to step SP3, so that the information icon chart display part $AR_{EY}$ is displayed on the display screen 4A as the initial screen of a program guide mode and, for example, the information icon part EY at the left and upper corner part is indicated as the initial state of the cursor KA.

In this condition, the CPU 29 waits for again the input operation of the remote commander 5 by the user. When the user operates any one of the operating buttons of the remote commander 5, the CPU 29 moves to step SP5 to decide the contents of the input by the remote commander 5. In this instance, in case the guide button K11 of the remote commander 5 is being operated, the CPU 29 cancels the program guide mode and returns to the above described step SP1 to display the main text of the initially selected program.

On the other hand, in case it is decided that the determination button K6 of the remote commander 5 is being operated in the step SP5, the CPU 29 advances to step SP15 shown in FIG. 9 to display on the display screen 4A the main text of the program corresponding to the information icon part EY which is designated by the cursor in the above described step SP 3.

Figure 7:
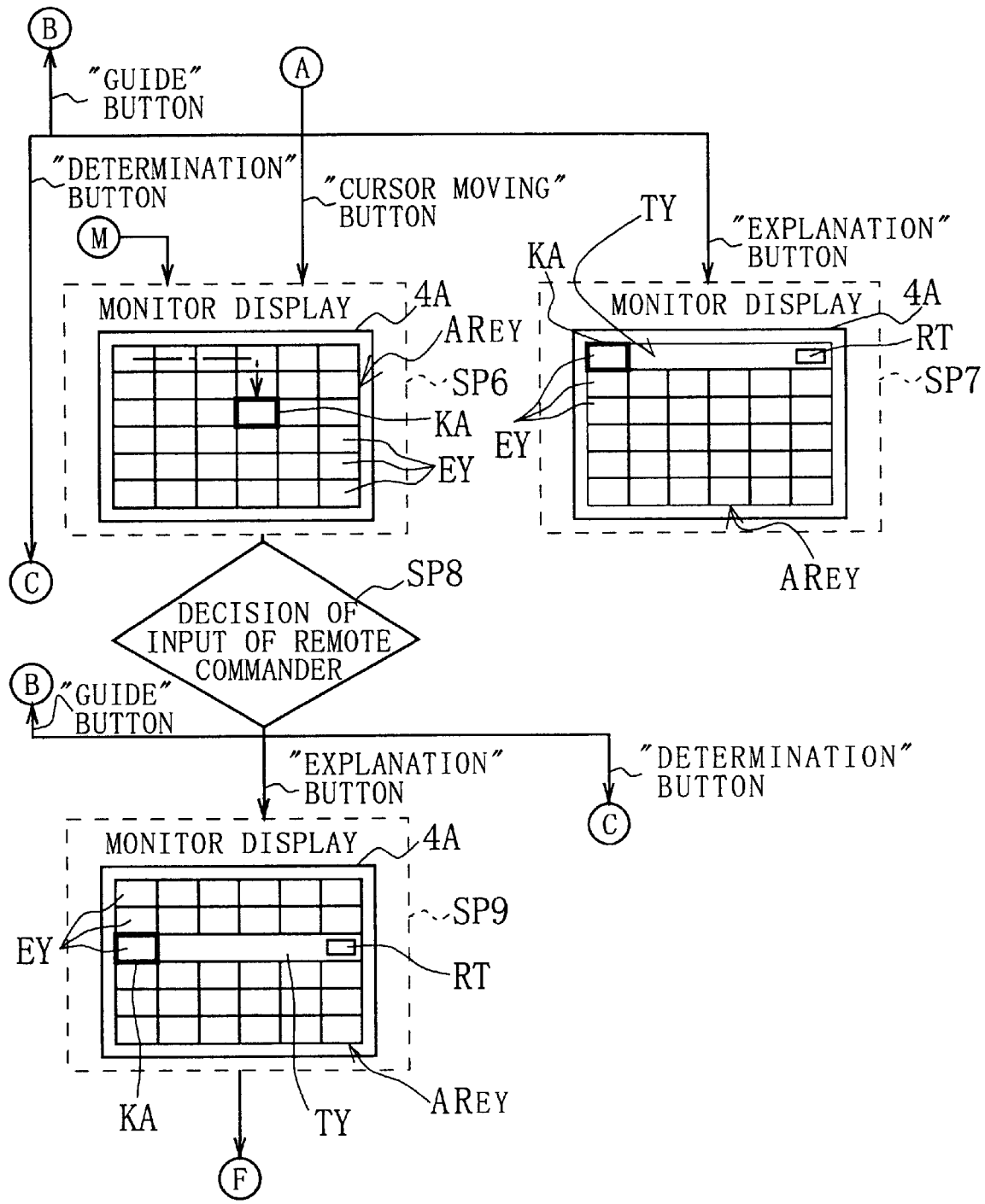
FIG. 7 is a flowchart showing an information display procedure.

Further, in case it is decided that the explanation button K12 of the remote commander 5 is being operated in the step SP5, the CPU 29 moves to step SP7 in FIG. 7 so that it displays the title part TY on the display screen 4A and displays the title corresponding to the information icon part EY designated by the cursor and its summary at the same time.

On the other hand, in case it is decided that the cursor moving buttons K2 to KS are being operated in the step SP5, the CPU 29 advances to step SP6 to move the cursor KA on the display screen 4A in accordance with the above operations. Thus, the user can move the cursor to a desired information icon part EY by operating the cursor moving buttons K2 to KS of the remote commander 5.

In this state, the CPU 29 waits for again the input operation of the remote commander 5 by the user. In this case, when the user operates any one of the operating buttons of the remote commander 5, the CPU 29 advances to step SP A to decide the contents of the input by the remote commander 5. At this time, when the guide button K11 of the remote commander 5 is being operated, the CPU 29 cancels the program guide mode and returns to the above mentioned step SP1 to display the main text of the program which has been initially selected.

On the other hand, in case it is decided that the determination button K6 of the remote commander 5 is being operated in the step SP8, the CPU 29 moves to step SP15 shown in FIG. 9, and displays on the display screen 4A the main text of the program corresponding to the information icon part EY which is designated by the cursor in the above mentioned step SP6.

Further, in case it is decided that the explanation button K12 of the remote commander 5 is being operated in the step SP8, the CPU 29 advances to step SP9 shown in FIG. 7, displays the title part TY in the side part of the information icon part EY which is designated by the cursor at this time, and displays the title corresponding to the information icon part EY designated by the cursor at this time and its gist or summary.

Under this state, the CPU 29 waits for again the input operation of the remote commander 5 by the user. At this point, when the user operates any one of the operating buttons of the remote commander 5, the CPU 29 moves to step SP10 shown in FIG. 8 to decide the contents of the input from the remote commander 5. Here, in case the guide button K11 of the remote commander 5 is being operated, the CPU 29 cancels the program guide mode and returns to the above step SP1 to display the main text of the first selected program.

As compared with the above, when it is decided that the determination button K6 of the remote commander 5 is being operated, the CPU 29 advances to the step SP15 shown in FIG. 9 and displays on the display screen 4A the main text of the program corresponding to the information icon part EY which is designated by the cursor in the steps SP6 and SP9.

Further, as compared with the above, when it is decided that the cursor moving button K5 of the remote commander 5 is being operated in the step SP10, this indicates that the user instructs the cursor KA to move to the return icon part RT under the state of the step SP9 in FIG. 9. At this time, the CPU 29 moves to step S12 to display the cursor KA on the return icon part RT. In this state, the CPU 29 waits for again the input operation of the remote commander 5 by the user. Here, when the user operates any one of the operating buttons of the remote commander 5, the CPU 29 advances to step SP14 shown in FIG. 9 to decide the contents of the input from the remote commander 5.

In case it is decided that the explanation button K12 is operated in the step SP14, the CPU 29 returns to the above described step SP6 and displays on the display screen 4A the information icon chart display part $AR_{EY}$ in which the information icon EY corresponding to the program whose title is displayed in the step SP12 is indicated by the cursor KA.

As compared with the above, in case it is decided that the guide button K11 is operated in the step SP14, the CPU 29 cancels the program guide mode and returns to the above described step SP1 to display the main text of the initially selected program. Further, in case it is decided that the determination button K6 of the remote commander 5 is being operated in the step SP14, the CPU 29 returns to the above mentioned step SP1 as a result of the return icon part RT being designated by the user in the above step SP12, thereby displaying the main text of the first selected program.

Figure 8:
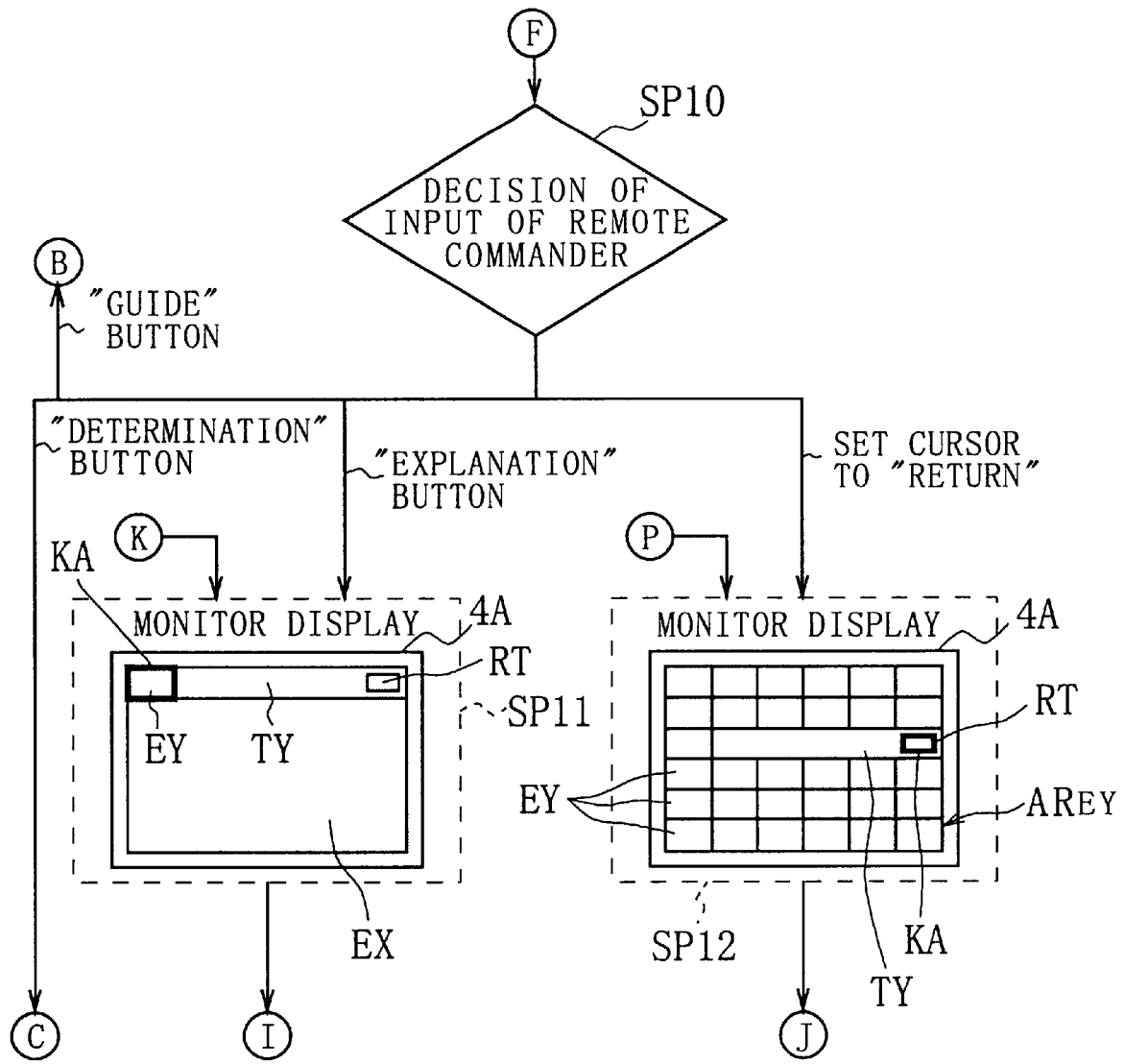

Here, in case it is decided that the explanation button K12 of the remote commander 5 is being operated in the above step SP10, the CPU 29 advances to step SP11 shown in FIG. 8, displays an information content explaining part EX on the display screen 4A and displays the contents of the program corresponding to the information icon part EY, that is, the information icon part EY designated in the steps SP6 an SP9, which is designated by the cursor at this time in sentences.

Under this state, the CPU 29 waits for again the input operation of the remote commander 5. At this point, when the user operates any one of the operating buttons of the remote commander 5, the CPU 29 moves to step SP13 shown in FIG. 9 to decide the contents of the input from the remote commander 5. In case the guide button K11 of the remote commander 5 is being operated, the CPU 29 cancels the program guide mode and returns to the above step SP1 to display the main text of the first selected program.

On the other hand, in case it is decided that the explanation button K12 is operated in the step SP13, the CPU 29 continues to display the contents of the above mentioned step SP11. Further, in case it is decided that the determination button K6 is being operated in the step SP13, the CPU 29 moves to the next step SP15, displays on the display screen 4A the main text of the program corresponding to the information icon part EY, that is, the information icon part EY designated in the steps SP6, SP9 and SP 11, which is designated by the cursor at this time and finishes the selection of the programs by the user.

As compared with the above, in case it is decided that the cursor moving button K5 of the remote commander 5 is being operated, this implies that the user instructs the cursor KA to move to the return icon part RT under the state of the step SP11. At this time, the CPU 29 moves to step SP16 to display the cursor KA on the return icon part RT. In this state, the CPU 29 stands by again the input operation of the remote commander 5 by the user. Here, when the user operates any one of the operating buttons of the remote commander 5, the CPU 29 advances to step SP17 to decide the contents of the input by the remote commander 5.

When it is decided that the explanation button K12 is being operated in the step SP17, the CPU 29 returns to the above described step SP12 to return to the screen on which the title part TY of the program whose contents have been explained in the information content explaining part EX is displayed on the information icon chart display part $AR_{EY}$ in step SP16.

Further, when it is decided that the guide button K11 is being operated in the step SP17, the CPU 29 cancels the program guide mode and returns to the above mentioned step SP1 to display the main text of the first selected program.

Still further, when it is decided that the determination button K6 of the remote commander 5 is operated in the step SP17, the CPU 29 returns to the above mentioned step SP1 because the return icon part RT is designated by the user in the above step SP16 and displays the main text of the initially selected program.

(4) Operations and Effects of the Embodiment

Figure 6:
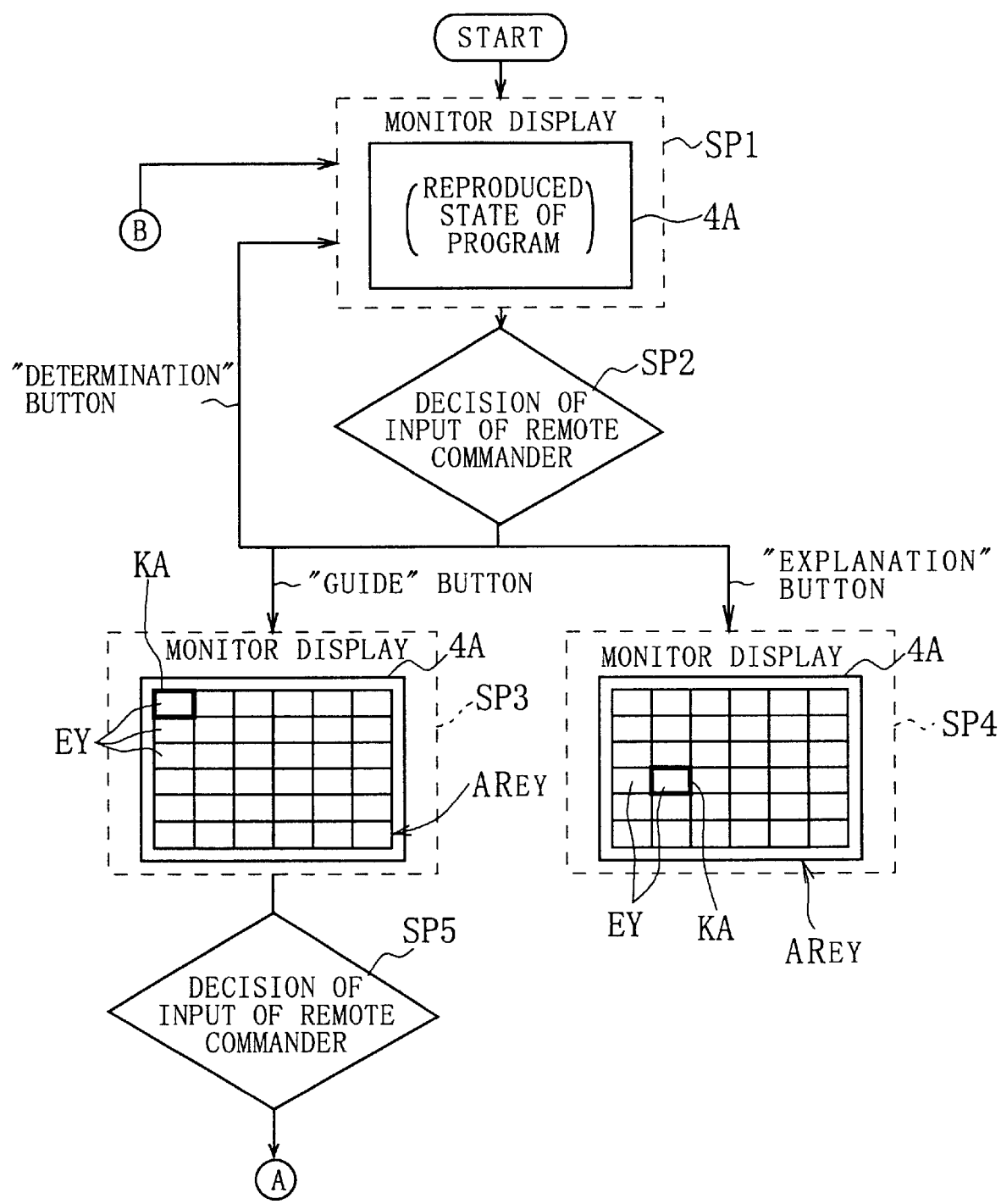
FIG. 6 is a flowchart showing an information display procedure.

According to the configurations as described above, when the user manipulates the guide button K11 of the remote commander 5, the CPU 29 enters the program guide mode so that the information icon chart display part $AR_{EY}$ as shown in the step SP3 in FIG. 6 is displayed on the display screen 4A of the monitor device 4. On this display screen 4A, a plurality of information icon parts EY corresponding to a plurality of channels are displayed lengthwise and sidewise. Broadcasting stations corresponding to the respective channels are respectively displayed by characters in the information icon parts EY. Accordingly, while the user simultaneously sees the icons which represent the plurality of channels or broadcasting stations by viewing the information icon chart display part $AR_{EY}$, he operates the determination button K6 of the remote commander 5, so that he can select a desired channel.

Further, under the manipulation of the explanation button K12 of the remote commander 5, the title bar comprising the information icon part EY, the title part TY and the return icon part RT which is shown in the step SP9 in FIG. 7 is displayed on the display screen 4A. Hence, the user can see the title of the program which is being broadcasted and a simple explanation of its summary in a channel corresponding to a specific information icon part EY designated by the user among a plurality of information icon parts EY.

Thus, the user can understand the program guide (the title bar) which is being displayed at present indicates a next appearing display step of the information icon chart display part $AR_{EY}$ and readily decide the display step of the present program guide. Further, under this state, the user can see other information icon parts EY, namely, other channels as well as the title bar, so that he can see the explanation of the summary of the channel in the title bar by comparing it with other information icon parts EY (channels).

In this state, when the user operates the explanation button K12 of the remote commander 5, the screen of an information card type shown in the step SP11 in FIG. 8 is displayed on the display screen 4A. Since the specifically explained sentence of the contents of the program displayed on the information content explaining part EX as well as the title bar is displayed in the display screen 4A, the user can view not only the explanation of the program, but also the broadcasting station (channel) for providing the channel designated by the information icon part EY and the title of the program indicated by the title part TY.

In such a manner, the user can switch the information icon chart display part $AR_{EY}$, the title bar and the guide screen of the information card type only by manipulating the explanation button K12 of the remote commander 5. Further, in the respective display steps, he operates the determination button K6, so that he can immediately display the main text of the program of a channel corresponding to the information icon part EY designated by the cursor at this time. Thus, the display step of the program guide can be changed from the item of a rough classification such as a channel (the information icon part EY), the title of the program which is being broadcasted in this channel, the detailed explanation of the title of the program, etc. to a particular explanation in accordance with a constant order.

Therefore, according to the configuration mentioned above, the display steps of the program guide can be switched with a smooth transition of display having no sense of hierarchical layers, so that the manageability of the user can be improved.

(5) Other Embodiments (5-1) In the above mentioned embodiment, although the respective information icon parts EY are arranged at random lengthwise and sidewise for the information icon chart display part $AR_{EY}$, needless to say, the present invention is not limited thereto and, for example, the information icon parts EY which represent the channels belonging to the same genre may be arranged in the lengthwise direction of the chart.

In this instance, the CPU 29 shown in FIG. 2 displays the information icon chart display part $AR_{EY}$ as illustrated in FIG. 10 on the display screen by operating the guide button K11 of the remote commander 5 shown in FIG. 3. On this information icon chart display part $AR_{EY}$, the channels or the information icon parts EY which are respectively broadcasting the program belonging to the same genre A, B, C, D, E or F are arranged in the lengthwise direction, based on the EPG information. Further, a genre retrieving icon chart display part $AR_{GE}$ in which a plurality of genre retrieving icons GE corresponding to the respective lengthwise columns are arranged is displayed below the information icon chart display part $AR_{EY}$. The user can retrieve a program for the respective channels by using the genre retrieving icon chart display part $AR_{GE}$.

Specifically, as illustrated in FIG. 11A, the guide button K11 of the remote commander 5 is operated so that the channels which represent the programs respectively belonging to the same genre are displayed lengthwise in the forms of the information icon parts EY on the display screen 4A. The genre retrieving icon chart display part $AR_{GE}$ described with reference to FIG. 10 is displayed below the information icon chart display part $AR_{EY}$. Under this state, when the user manipulates the cursor moving buttons K2 to K5 of the remote commander 5, he can set the cursor KA to any one of the genre retrieving icons GE as illustrated in FIG. 11B.

In this state, when the user operates the explanation button K12 of the remote commander 5, the information icon parts EY located in the lengthwise column which corresponds to the genre retrieving icon GE designated by the cursor KA at this time are all changed to the title bars as illustrated in FIGS. 11C to 12A.

Under this state shown in FIG. 12A, the user can see simultaneously the titles of the respective programs belonging to the same genre. Further, he can set the cursor KA to the information icon part EY corresponding to the desired title as illustrated in FIG. 12B by operating the cursor moving buttons K2 to K5 of the remote commander 5. Thus, by operating the explanation button K12 of the remote commander 5, the information content explaining part EX on which the particular explanation of the program designated by the cursor is displayed is displayed on the display screen 4A as shown in FIG. 12C, hence, the user can view the particular explanation of the program.

In this connection, when the cursor is set to a desired information icon EY or a desired title bar and the determination button K6 of the remote commander 5 is manipulated, the main text of the program which is designated by the cursor KA can be rapidly displayed on the display screen 4A.

Therefore, the user can know the channels or the broadcasting stations which are broadcasting the programs belonging to the same genre only by viewing the information icon parts EY arranged in the lengthwise direction of the information icon chart display part $AR_{EY}$ shown in FIG. 10. The user also can see the titles pertaining to the same genre at the same time only by setting the cursor KA to any one of the genre retrieving icons GE which are displayed on the genre retrieving icon chart display part $AR_{GE}$. Accordingly, the user can considerably easily retrieve the programs.

Parenthetically, referring to FIGS. 10 to 12C, although the information icons EY belonging to the same genre are arranged in the lengthwise direction, needless to say, the present invention is not limited thereto, and, for instance, in case the title bars are formed in lengthwise long shapes so as to meet a lengthwise notation of Japanese or a column by column notation, the information icon parts EY belonging to the same genre may be arranged in the sidewise direction. In this case, the genre retrieving icons GE may be displayed in the right and left sides of corresponding sidewise rows.

(5-2) In the above described embodiment, although only the respective information icon parts EY are arranged at random lengthwise and sidewise as the information icon chart display part $AR_{EY}$, it is to be recognized that the present invention is not limited thereto, and, for instance, genre identification codes which are sorted depending on their color or pattern may be respectively affixed to a part of the respective information icon parts EY.

More specifically, FIG. 13A shows the information icon chart display part $AR_{EY}$ displayed on the display screen 4A. In this Figure, on the upper parts of the respective information icon parts EY, the genre of the programs which are being broadcasted in the channels represented by these information icon parts EY is displayed by genre identification codes CO based on their colors or patterns. The colors or patterns corresponding to the respective genres are displayed on the upper part of the display screen 4A together with the names of the respective genres (refer to genre identification code index parts IDX).

Consequently, the user can readily identify the genres in accordance with the genre identification codes CO. FIG. 13B shows a state displayed in an information card format. Also, in this case, the genre identification code CO is displayed on the upper part of the information icon part EY.

Figure 14A:
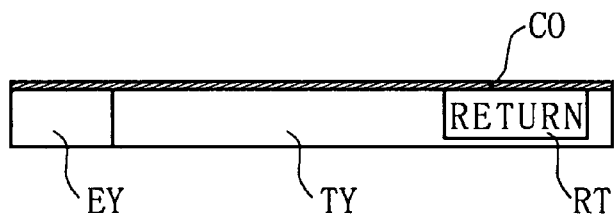

FIGS. 14A, 14B, 14C and 14D show modifications of a genre identification code part CO. In FIG. 14A, the genre identification code part CO is displayed on all the upper part of the title bar composed of the information icon part EY, the title part TY and the return icon part RT.

Figure 14B:
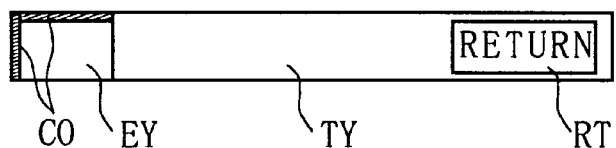

In FIG. 14B, the genre identification code parts CO are displayed on the upper part and the left part of the information icon part EY of the title bar. In this case, needless to say, the genre identification code parts CO may be displayed on the upper and left parts of all information icon parts EY which are displayed in the information icon chart display part $AR_{EY}$ as well as the display of the information icon part EY of the title bar. Further, it is to be noted that the positions of the genre identification code parts CO are not limited to the upper and left parts, but may be located in right and lower parts in combination.

Figure 14C:
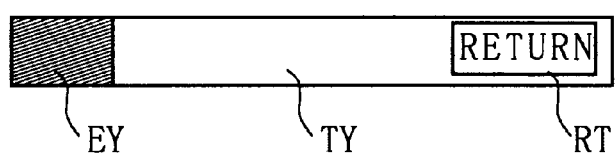

Further, in FIG. 14C, the whole part of the information icon part EY of the title bar is coated with color or a pattern corresponding to the genre so that the genre is displayed. In this case, all the information icon parts EY 20 which are displayed on the information icon chart display part $AR_{EY}$ may be similarly classified depending on their colors or patterns. Accordingly, the classified genres can be more easily identified.

Figure 14D:
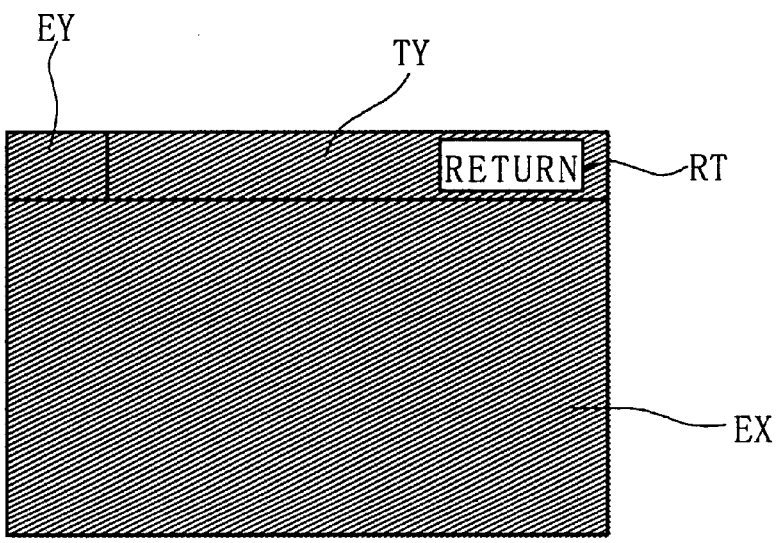

Besides, in FIG. 14D, the entire part of a part which is displayed in accordance with the information card format is colored or displayed so as to be coated with a pattern depending on its genre. Thus, the user can recognize the genre with an intenser impression.

(5-3) In the above described embodiment, although the six information icon parts EY are displayed lengthwise and sidewise on the information icon chart display part $AR_{EY}$, in other words, the total of 36 information icon parts EY are displayed, needless to say, the present invention is not limited thereto, and more information icon parts EY may be displayed by subdividing the information icon parts.

Further, on the other hand, as a method for treating further more information icon parts EY without changing the number of the information icon parts EY to be displayed on the display screen 4A, a part (36 pieces) of many information icon parts EY may be displayed on the display screen 4A, as shown in FIGS. 15A and 15B. Specifically, FIG. 15A shows a lengthwise scroll bar $SC_1$ and a sidewise scroll bar $SC_2$. An upward scroll button $SC_{UP}$ or a downward scroll button $SC_{DW}$ added to the lengthwise scroll bar $SC_1$ is designated by the cursor KA, so that the array of the information icons on the information icon chart display part $AR_{EY}$ can be scrolled upward and downward on the screen. In addition, a leftward scroll button $SC_L$ or a rightward scroll button $SC_R$ added to the sidewise scroll bar $SC_2$ is designated by the cursor KA, so that the array of the information icons on the information icon chart display part A can be scrolled rightward and leftward. As a result, the information icon parts EY more than the number of the information icon parts EY which can be displayed on the display screen 4A can be treated.

Further, FIG. 15B shows a page changing icon $AR_P$ provided in place of the upward and downward scroll buttons $SC_{UP}$ and $SC_{DW}$ and the rightward and leftward scroll buttons $SC_L$ and $SC_R$ shown in FIG. 15A and when a page return button P1 or a page feed button P2 is designated by the cursor, the array of the information icons in the information icon chart display part $AR_{EY}$ can be handled for each page. Also in this case, the information icon parts EY more than the number of the information icon parts EY capable of being displayed on the display screen 4A can be treated.

(5-4) In the above mentioned embodiment, although the respective programs of the satellite broadcasting are displayed as the information icons, it is obvious that the present invention is not limited thereto, but, as shown in FIGS. 16A and 16B, source icons SOU of television broadcasting, home page and disks may be provided on the upper part of the information icon chart display part $AR_{EY}$ displayed on the display screen 4A and the information icons corresponding to a mode such as a TV mode, a WWW mode and a DISC mode which is designated by each source icon SOU may be displayed in, for instance, an information guide system comprising a media source such as Internet World Wide Web (WWW) home page, a disk library such as DVDs, CDs, etc.

Specifically, as shown in FIG. 16A, the television (TV) mode is designated by the source icon SOU and the information icons $EY_{TV}$ corresponding to television programs or channels are displayed on the information icon chart display part $AR_{EY}$. Under this state, when the disk (DISC) mode of the source icon SOU is designated, for instance, information icons $EY_{DISC}$ obtained by reducing or cutting down the graphic forms of the jackets of the disks are listed and displayed on the information icon chart display part $AR_{EY}$, as illustrated in FIG. 16B. Therefore, the user can select the information icons of a plurality of types of media only by selecting the source icon SOU. In this case, a disk changer loading type in which a plurality of disks can be accommodated is employed as the DVD 8 or the MD 9 shown in FIG. 1, so that the respective disks can be selected on the display screen 4A of the monitor device 4.

When the disk changer is loaded with the respective disks, the user may register the information of the respective disks in the SRAM 36 of the receiver/decoder 2 or the disk information may be previously recorded on each of the disks, the recorded disk information may be read when the disk changer is loaded with the disk and the read information may be stored in the SRAM 36. Further, the information guide of the home page information of the Internet may be desirably executed based on information which is inputted through a communication line, fetched and taken into the SRAM 36.

(5-5) In the above described embodiment, although the display sequence of the program guide is executed by the CPU 29 of the receiver/decoder 2, needless to say, the present invention is not limited thereto, but a separate device may be preferably used as an information guide device.

As apparent from the above description, according to the present invention, an information display method comprises a first display step of displaying information icons for guiding respective information on a part of a display screen as the base units of an information guide; a second display step of displaying the summaries of information corresponding to the information the information icons; and a third display step of displaying the explanation of the contents of the information which corresponds to the information icons at positions respectively corresponding to the information icons and the displays of the titles. The respective display steps can be switched by the user, hence, the user can more understandably and easily retrieve or search for desired information.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method of displaying an electronic program guide on a display screen, comprising the steps of:

setting said display screen to an information guide mode for displaying said electronic program guide;

displaying an icon table comprised of a plurality of channel icons arranged in rows and columns on said display screen; each channel icon corresponding to a programming channel for display on said display screen;

selecting one of said plurality of channel icons displayed on said display screen;

displaying a title bar corresponding to the selected channel icon horizontally across the row of said icon table containing the selected channel icon; said title bar comprising said channel icon, a title part, and a return icon; said title part comprising a program title and a program summary sentence for a program broadcast by said programming channel corresponding to said channel icon;

selecting said title bar; and displaying an explanation part by shifting the selected title bar and displaying said explanation part over said icon table; said explanation part containing explanatory information about the program indicated by said title bar.

2. The method according to claim 1, wherein said information guide mode is set by operation of a guide button on a remote commander.

3. The method according to claim 1, wherein the selected channel icon is selected by positioning a cursor over a desired channel icon using a cursor control and selecting the desired channel icon using an explanation button; said cursor control and said explanation button being located on a remote commander.

4. The method according to claim 3, wherein said title bar is selected using said explanation button.

5. The method according to claim 1, further comprising the step of selecting said return icon and returning to the icon table display step.

6. The method according to claim 1, wherein said icon table display step further displays a scrolling indicator for scrolling said icon table when the icon table is larger than said display screen.

7. The method according to claim 1, wherein said icon table display step divides said icon table into pages and displays the icon table one page at a time when the icon table is larger than said display screen.

8. The method according to claim 1, wherein each channel icon indicates the genre of the corresponding programming channel.

9. A method of displaying an electronic program guide on a display screen, comprising the steps of:

setting said display screen to an information guide mode for displaying said electronic program guide;

displaying an icon table comprised of a plurality of channel icons arranged in rows and columns on said display screen; each channel icon corresponding to a programming channel for display on said display screen; said plurality of channel icons being grouped into columns corresponding to programming channels of the same genre;

displaying a plurality of genre retrieving icons; each genre retrieving icon corresponding to a column of genre grouped channel icons;

selecting one of said plurality of genre retrieving icons;

displaying a title bar for each channel icon in the column corresponding to the selected genre retrieving icon horizontally across the row of said icon table containing the respective channel icon; each said title bar comprising said channel icon, a title part, and a return icon; said title part comprising a program title and a program summary for a program broadcast by said programing channel corresponding to said channel icon;

selecting one of said title bars; and displaying an explanation part by shifting the selected title bar and displaying said explanation part over said icon table; said explanation part containing explanatory information about the program indicated by said title bar.

10. The method according to claim 9, wherein each of said plurality of channel icons indicates the genre of the corresponding programming channel.

11. An apparatus for displaying an electronic program guide on a display screen, comprising:

setting means for setting said display screen to an information guide mode for displaying said electronic program guide;

icon table display means for displaying an icon table comprised of a plurality of channel icons arranged in rows and columns on said display screen; each channel icon corresponding to a programming channel for display on said display screen;

selecting means for selecting one of said plurality of channel icons displayed on said display screen;

title bar display means for displaying a title bar corresponding to the selected channel icon horizontally across the row of said icon table containing the selected channel icon; said title bar comprising said channel icon, a title part, and a return icon; said title part comprising a program title and a program summary sentence for a program broadcast by said programming channel corresponding to said channel icon;

said selecting means further selecting said title bar; and explanation display means for displaying an explanation part by shifting the selected title bar and displaying said explanation part over said icon table; said explanation part containing explanatory information about the program indicated by said title bar.

12. The apparatus according to claim 11, wherein said setting means for said information guide mode is a guide button on a remote commander.

13. The apparatus according to claim 11, wherein said selecting means selects the selected channel icon by positioning a cursor over a desired channel icon using a cursor control and selects the desired channel icon using an explanation button; said cursor control and said explanation button being located on a remote commander.

14. The apparatus according to claim 13, wherein said title bar is selected using said explanation button.

15. The apparatus according to claim 11, wherein said return icon is selected by said selecting means and said icon table display means again displays said icon table.

16. The apparatus according to claim 11, wherein said icon table display means further displays a scrolling indicator for scrolling said icon table when the icon table is larger than said display screen.

17. The apparatus according to claim 11, wherein said icon table display means divides said icon table into pages and displays the icon table one page at a time when the icon table is larger than said display screen.

18. The apparatus according to claim 11, wherein each channel icon indicates the genre of the corresponding programming channel.

* * * * *